US012712447B2

(12) United States Patent
Sugawara

(10) Patent No.: US 12,712,447 B2
(45) Date of Patent: Aug. 18, 2026

(54) SWITCHING CONTROL DEVICE AND POWER CONVERSION DEVICE

(71) Applicant: Mitsubishi Electric Corporation, Tokyo (JP)

(72) Inventor: Retsu Sugawara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/125,753

(22) PCT Filed: Dec. 27, 2022

(86) PCT No.: PCT/JP2022/048206

§ 371 (c)(1),
(2) Date: Apr. 30, 2025

(87) PCT Pub. No.: WO2024/142256

PCT Pub. Date: Jul. 4, 2024

(65) Prior Publication Data

US 2026/0012087 A1 Jan. 8, 2026

(51) Int. Cl.
*H02M 1/44* (2007.01)
*H02M 3/156* (2006.01)
*H02M 7/5395* (2006.01)

(52) U.S. Cl.
CPC ............. *H02M 1/44* (2013.01); *H02M 3/156* (2013.01); *H02M 7/5395* (2013.01)

(58) Field of Classification Search
CPC ...... H02M 1/44; H02M 3/156; H02M 7/5387; H02M 7/5395
See application file for complete search history.

(56) References Cited

U.S. PATENT DOCUMENTS 8,050,065 B2 * 11/2011 Hasegawa ............... B60L 58/33 363/65
8,217,533 B2 * 7/2012 Jones ........................ H02J 3/01 363/35

(Continued)

FOREIGN PATENT DOCUMENTS

CN 101589540 A 11/2009
DE 112008000189 T5 12/2009

(Continued)

OTHER PUBLICATIONS

Machine translation JP-2006288103-A (Year: 2006).*

(Continued)

*Primary Examiner* — Thienvu V Tran
*Assistant Examiner* — Yahveh Comas Torres
(74) *Attorney, Agent, or Firm* — XSENSUS LLP

(57) ABSTRACT

A switching control device is a device that controls a switching operation performed by a switching element, and includes: a frequency setting unit that sets at least a first carrier frequency and a second carrier frequency; a phase shift setting unit that sets a phase difference between a first switching square wave determined by the first carrier frequency set by the frequency setting unit and a second switching square wave determined by the second carrier frequency set by the frequency setting unit; and a control signal generation unit that controls the switching operation performed by the switching element on the basis of the phase difference set by the phase shift setting unit.

12 Claims, 12 Drawing Sheets

(56) References Cited

U.S. PATENT DOCUMENTS

| | | | | |
|---|---|---|---|---|
| 9,293,921 | B2 * | 3/2016 | Jones | H02J 3/01 |
| 10,425,032 | B2 * | 9/2019 | Tapadia | H02M 1/12 |
| 10,700,630 | B2 * | 6/2020 | Toba | H03K 7/08 |
| 10,855,173 | B2 * | 12/2020 | Hanioka | H02M 1/44 |
| 11,342,876 | B2 * | 5/2022 | Tapadia | H02M 1/15 |
| 12,273,024 | B2 * | 4/2025 | Choi | H02M 1/44 |
| 2006/0221654 | A1 | 10/2006 | Kawasaki et al. | |
| 2008/0284252 | A1 * | 11/2008 | Jones | H02J 3/01 307/82 |
| 2010/0002477 | A1 * | 1/2010 | Hasegawa | B60L 58/33 363/37 |
| 2012/0300512 | A1 | 11/2012 | Kin et al. | |
| 2018/0091036 | A1 * | 3/2018 | Das | H02M 7/44 |
| 2018/0251036 | A1 * | 9/2018 | Tapadia | H02P 5/74 |
| 2019/0363661 | A1 * | 11/2019 | Tapadia | H02P 27/08 |
| 2020/0274442 | A1 * | 8/2020 | Hanioka | H02M 7/53873 |
| 2022/0216784 | A1 * | 7/2022 | Choi | H02M 1/44 |

FOREIGN PATENT DOCUMENTS

| | | | | |
|---|---|---|---|---|
| JP | 2006288103 | A * | 10/2006 | H02M 1/12 |
| JP | 2009-089550 | A | 4/2009 | |
| JP | 2013-009582 | A | 1/2013 | |
| JP | 2013-038916 | A | 2/2013 | |
| JP | 5169118 | B2 * | 3/2013 | |
| JP | 5577799 | B2 * | 8/2014 | |
| JP | 5662899 | B2 * | 2/2015 | |
| JP | 2016-019322 | A | 2/2016 | |
| WO | WO-2018207249 | A1 * | 11/2018 | H02M 7/53873 |

OTHER PUBLICATIONS

Machine translation JP-5577799-B2 (Year: 2014).*

Machine translation JP-5662899-B2 (Year: 2015).*

Machine translation WO-2018207249-A1 (Year: 2018).*

Machine Translation JP-5169118-B2 (Year: 2013).*

International Search Report and Written Opinion mailed on Mar. 20, 2023, received for PCT Application PCT/JP2022/048206, filed on Dec. 27, 2022, 8 pages including English Translation.

Decision to Grant a Patent mailed on Aug. 1, 2023, received for JP Application 2023-530007, 3 pages including English Translation.

Office Action mailed on Dec. 4, 2025 for the corresponding German patent application No. 112022007934.7 with an English machine translation thereof, 12pp.

Office Action mailed on Mar. 12, 2026 for the corresponding Chinese patent application No. 202280102589.9 and an English machine translation thereof, 12pp.

* cited by examiner

FIG.9

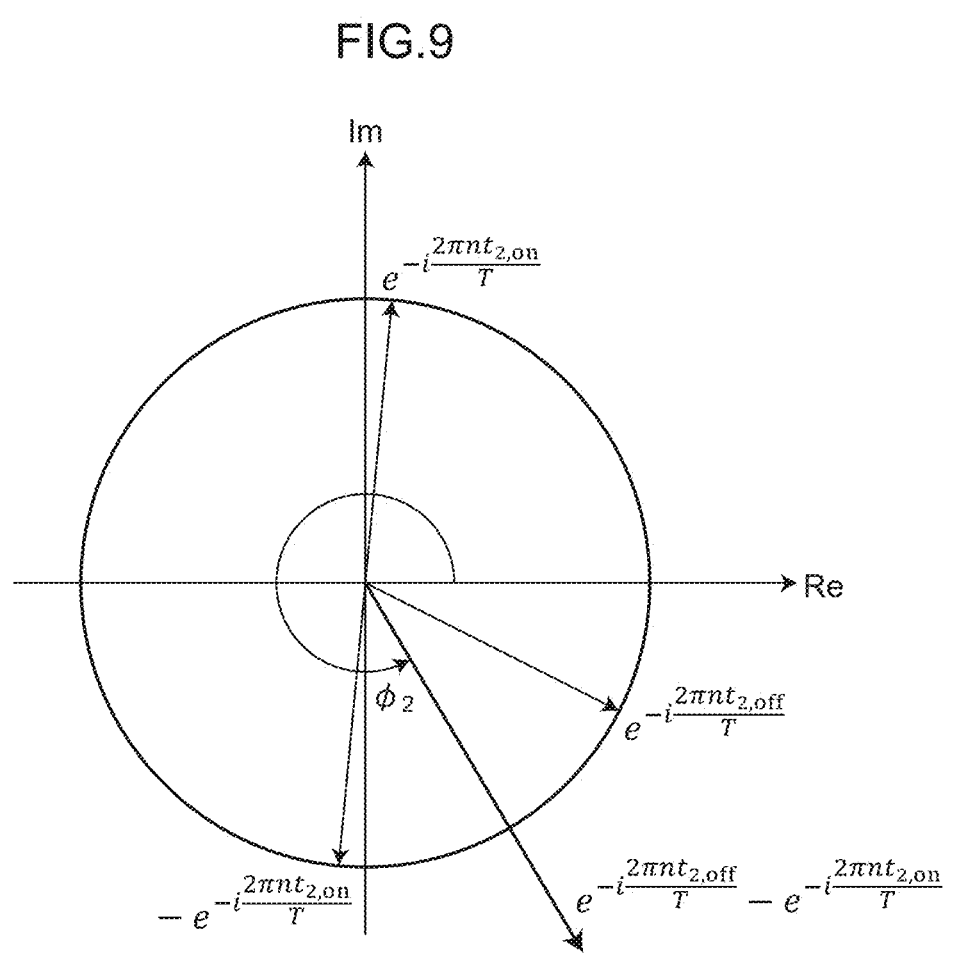

Im $e^{-i\frac{2\pi n t_{2,\mathrm{on}}}{T}}$

Re $\phi_2$ $e^{-i\frac{2\pi n t_{2,\mathrm{off}}}{T}}$ $-e^{-i\frac{2\pi n t_{2,\mathrm{on}}}{T}}$ $e^{-i\frac{2\pi n t_{2,\mathrm{off}}}{T}} - e^{-i\frac{2\pi n t_{2,\mathrm{on}}}{T}}$

FIG.10

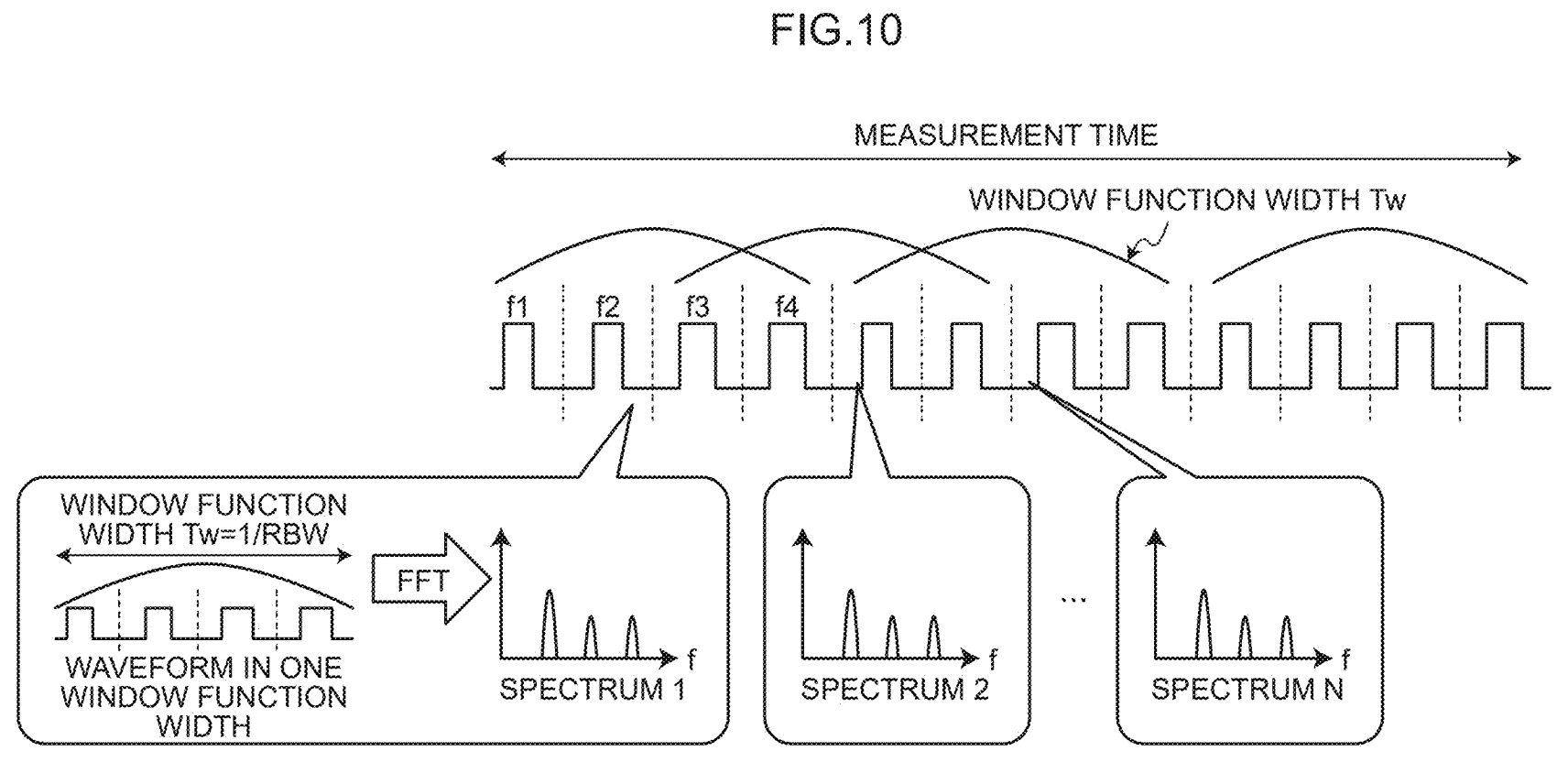

MEASUREMENT TIME

WINDOW FUNCTION WIDTH Tw f1 f2 f3 f4

WINDOW FUNCTION WIDTH Tw=1/RBW

WAVEFORM IN ONE WINDOW FUNCTION WIDTH

FFT f

SPECTRUM 1 f

SPECTRUM 2

...

f

SPECTRUM N

SWITCHING CONTROL DEVICE AND POWER CONVERSION DEVICE

CROSS-REFERENCE TO RELATED APPLICATION

This application is a national stage application, pursuant to 35 U.S.C. § 371, of International Patent Application No. PCT/JP2022/048206, filed Dec. 27, 2022, the entire contents of which are incorporated herein by reference.

FIELD

The present disclosure relates to a switching control device that controls a switching operation of a switching element and a power conversion device.

BACKGROUND

In a power conversion device that performs power conversion on the basis of a switching operation of a switching element, in a case where switching is performed at a certain switching frequency, electromagnetic noise is generated at a certain frequency and harmonic components of the frequency. Electromagnetic noise standards are set on a product classification basis, and countermeasures are required when electromagnetic noise exceeds an upper limit value in the standards. As a general countermeasure, a noise filter having an anti-noise component such as a choke coil or a capacitor is possibly used, but in a case of using the noise filter, an increase in size of the device and an increase in cost are problems. In order to solve the problems, there has been conventionally proposed a power conversion device including a frequency changing device that repeatedly outputs a frequency changing pattern including a plurality of frequency values, and a controller that controls on/off of a switching element at a switching frequency in accordance with the frequency changing pattern output from the frequency changing device (see, for example, Patent Literature 1). There has also been proposed a power conversion device that sets a period of a frequency change pattern in order to obtain a noise reduction effect even under various measurement conditions and detection methods (see, for example, Patent Literature 2).

CITATION LIST

Patent Literature

Patent Literature 1: Japanese Patent Application Laid-open No. 2006-288103

Patent Literature 2: Japanese Patent Application Laid-open No. 2016-19322

SUMMARY OF INVENTION

Problem to be Solved by the Invention

Conventional power conversion devices reduce electromagnetic noise by using a plurality of switching frequencies, but a sufficient noise reduction effect may not be obtained depending on measurement conditions. Therefore, a technique for obtaining a noise reduction effect under more various measurement conditions is demanded.

The present disclosure has been made in view of the above, and an object thereof is to provide a switching control device capable of obtaining a noise reduction effect under more various measurement conditions.

Means to Solve the Problem

In order to solve the above-described problem and achieve the object, a switching control device according to the present disclosure is a switching control device that controls a switching operation performed by a switching element, and includes: a frequency setting unit that sets at least a first carrier frequency and a second carrier frequency; a phase shift setting unit that sets a phase difference between a first switching square wave determined by the first carrier frequency set by the frequency setting unit and a second switching square wave determined by the second carrier frequency set by the frequency setting unit; and a control unit that controls the switching operation performed by the switching element on the basis of the phase difference set by the phase shift setting unit.

Effects of the Invention

The switching control device according to the present disclosure achieves an effect that it is possible to obtain a noise reduction effect under more various measurement conditions.

BRIEF DESCRIPTION OF DRAWINGS

FIG. 9 is a diagram illustrating a phase of a composite vector of two terms determined by switching times of another certain carrier frequency on the complex plane.

FIG. 10 is a diagram for explaining a spectrum calculation method in short-time Fourier transform.

DESCRIPTION OF EMBODIMENTS

Hereinafter, a switching control device and a power conversion device according to each embodiment will be described in detail with reference to the drawings.

First Embodiment

Figure 1:
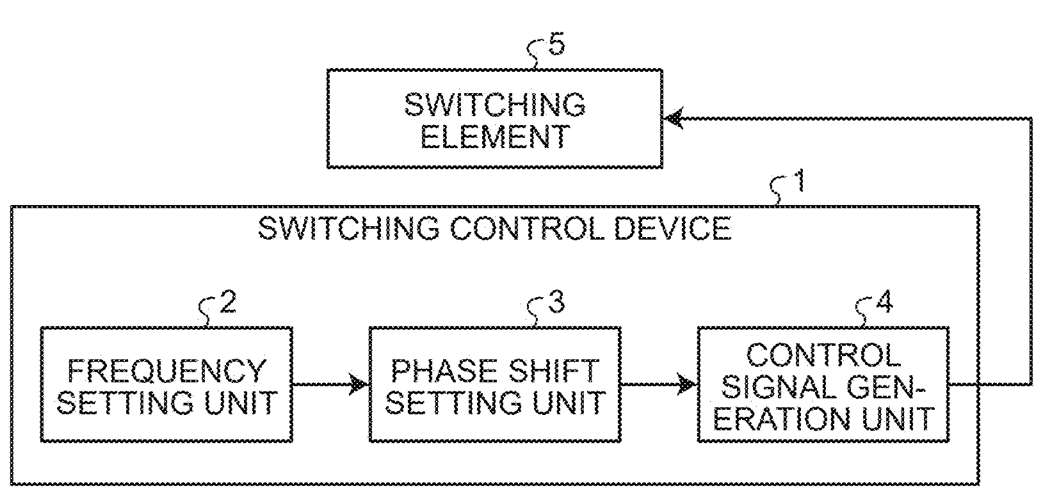
FIG. 1 is a diagram illustrating a configuration of a switching control device according to a first embodiment.

FIG. 1 is a diagram illustrating a configuration of a switching control device 1 according to a first embodiment. The switching control device 1 is a device that controls a switching operation performed by a switching element 5, and includes a frequency setting unit 2 that sets two types of carrier frequencies f1 and f2 and a frequency change period T which is a period in which the carrier frequencies change. The switching element 5 is included in, for example, a power conversion circuit included in a power conversion device.

The switching control device 1 further includes a phase shift setting unit 3 that sets a phase difference $\Delta\varphi$ between a switching square wave determined by the carrier frequency f1 set by the frequency setting unit 2 and a switching square wave determined by the carrier frequency f2 set by the frequency setting unit 2. With the frequency change period T set by the frequency setting unit 2, one period of which being $2\pi$, the phase difference $\Delta\varphi$ is defined as a difference between an intermediate time between an on time and an off time of the switching square wave determined by the carrier frequency f1 and an intermediate time between an on time and an off time of the switching square wave determined by the carrier frequency f2.

The switching control device 1 further includes a control signal generation unit 4 that generates a control signal for controlling the switching operation performed by the switching element 5 on the basis of the settings performed by the frequency setting unit 2 and the phase shift setting unit 3. The control signal generation unit 4 is an example of a control unit. The frequency setting unit 2 sets the carrier frequency f1 and the carrier frequency f2 and the phase shift setting unit 3 sets the phase difference $\Delta\varphi$ so as to reduce switching noise of harmonic components when the switching element 5 performs the switching operation.

In a specific example in the first embodiment, the frequency setting unit 2 sets two types of carrier frequencies f1=15 kHz and f2=30 kHz, and sets the frequency change period T=100 μs. In addition, the frequency setting unit 2 sets a duty ratio D=0.5, the duty ratio being a ratio of on time over one period of switching. The phase shift setting unit 3 sets a phase shift amount $\Delta\varphi=0.913\pi$ so as to reduce noise of a harmonic component around 460 KHz. The phase shift amount $\Delta\varphi$ is the above-described phase difference $\Delta\varphi$. That is, the frequency setting unit 2 sets a first carrier frequency f1, a second carrier frequency f2, the frequency change period T, and the duty ratio D depending on a harmonic component for which noise reduction is desired, and the phase shift setting unit 3 sets the phase difference $\Delta\varphi$ depending on the harmonic component.

Figure 2:
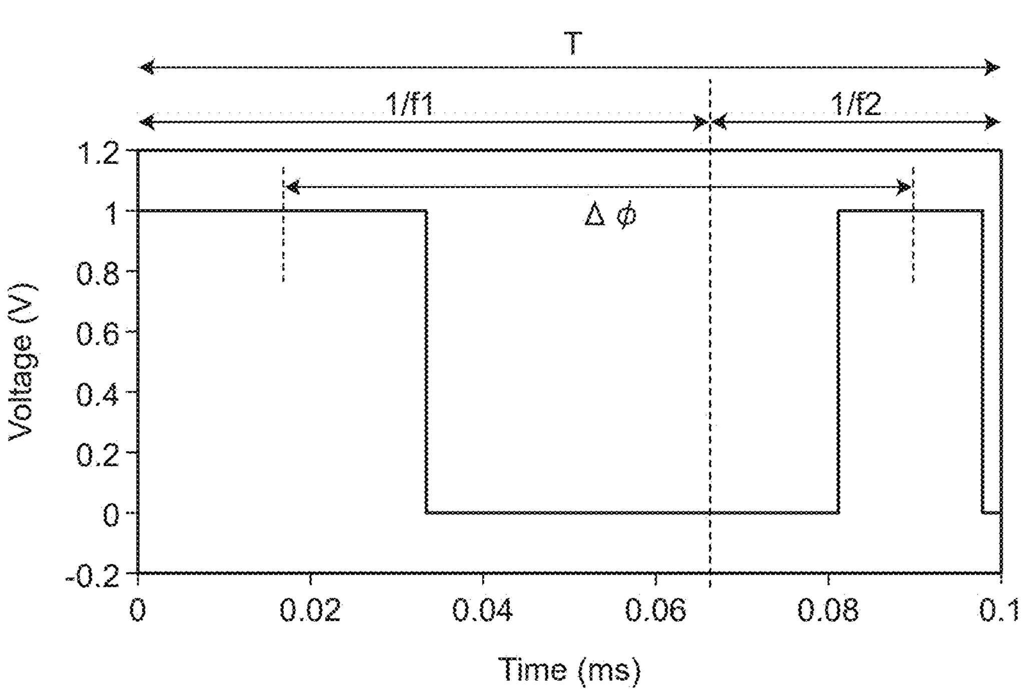
FIG. 2 is a diagram illustrating an example of a time waveform of a switching square wave in a control signal output from a control signal generation unit included in the switching control device according to the first embodiment.
Figure 3:
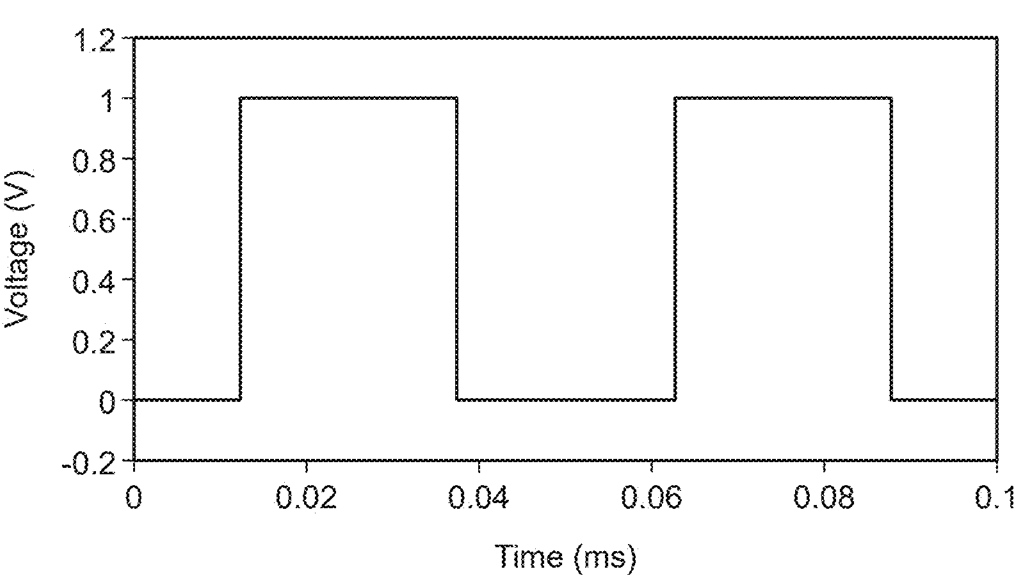
FIG. 3 is a diagram illustrating an example of a time waveform of a switching square wave in a case where the switching square wave is fixed.
Figure 4:
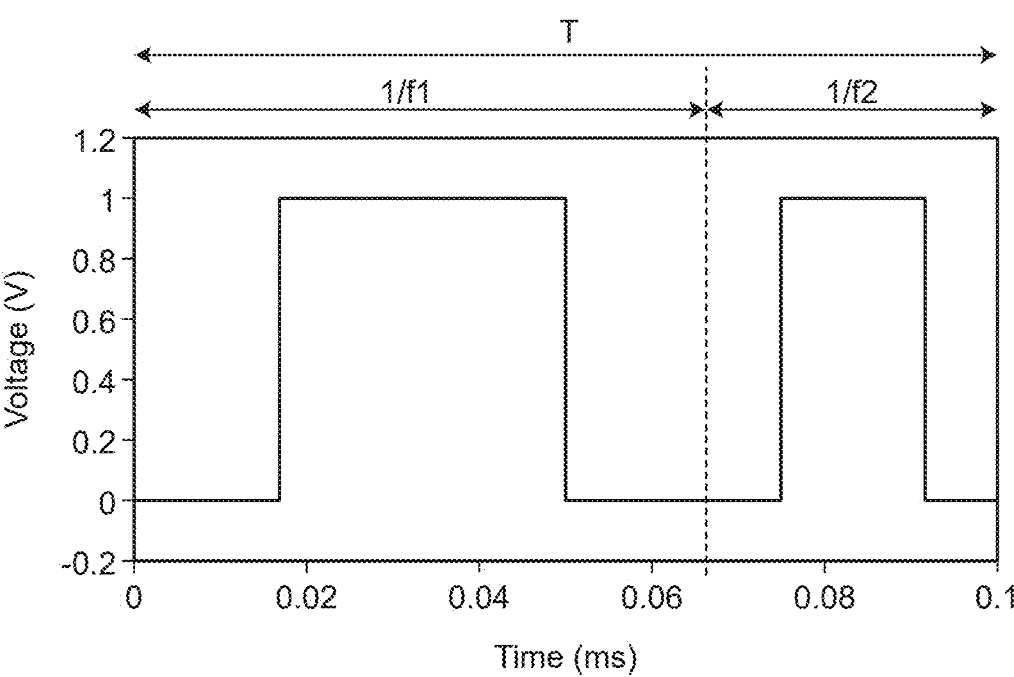
FIG. 4 is a diagram illustrating a time waveform of a switching square wave in a case where there is no phase shift, two types of carrier frequencies are set, and only the carrier frequency is variable.

FIG. 2 is a diagram illustrating an example of a time waveform of a switching square wave in a control signal output from the control signal generation unit 4 included in the switching control device 1 according to the first embodiment. FIG. 2 illustrates a time waveform of a switching square wave in a control signal output from the control signal generation unit 4 in a case where the above-described specific numerical values are set. FIG. 3 is a diagram illustrating an example of a time waveform of a switching square wave in a case where the switching square wave is fixed. FIG. 3 is a diagram for comparison with FIG. 2, and a fixed switching frequency f=20 kHz is used in FIG. 3. The fixed switching frequency f=20 kHz is selected in order to make the number of times of switching equivalent to the number of times of switching in a case where the two types of carrier frequencies in FIG. 2 are f1=15 kHz and f2=30 kHz, thereby making a switching loss condition comparable. As can be understood by comparing FIG. 2 with FIG. 3, the switching control device 1 outputs, from the control signal generation unit 4 to the switching element 5, not a control signal having a square wave in which an on time is repeatedly generated at a certain interval, but a control signal having a square wave in which on times each associated with one of reciprocals of two different frequencies are repeatedly generated. In the specific example in the first embodiment, the two different frequencies are a carrier frequency of 15 kHz and a carrier frequency of 30 kHz. FIG. 4 is a diagram illustrating a time waveform of a switching square wave in a case where there is no phase shift, two types of carrier frequencies f1=15 kHz and f2=30 kHz are set, and only the carrier frequency is variable. In each of FIGS. 2 to 4, the horizontal axis represents time and the vertical axis represents voltage.

Figure 5:
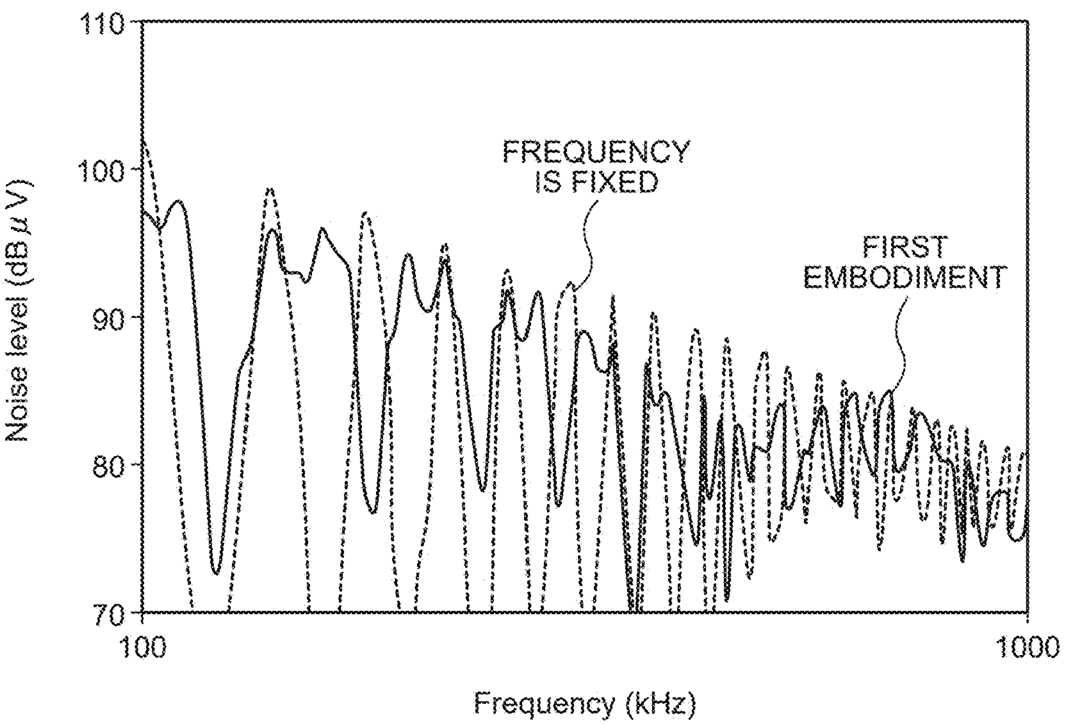
FIG. 5 is a diagram illustrating a frequency characteristic of electromagnetic noise in a case where the switching control device according to the first embodiment is used and a frequency characteristic of electromagnetic noise in the case where the switching square wave is fixed, in comparison with each other.
Figure 6:
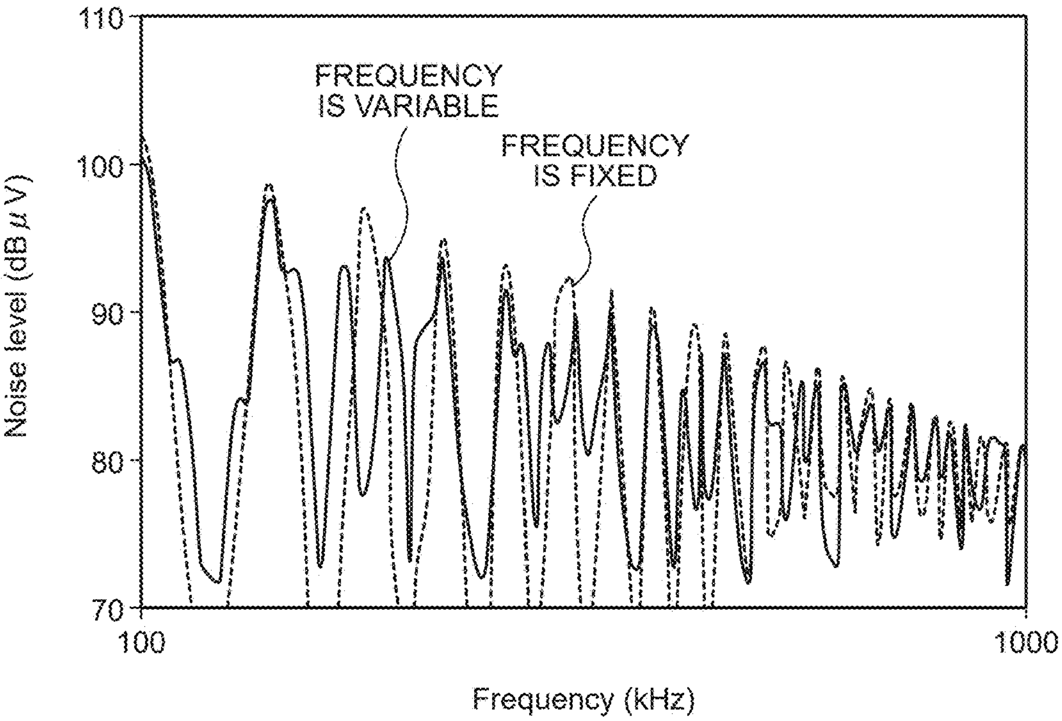
FIG. 6 is a diagram illustrating a frequency characteristic of electromagnetic noise in the case where the switching square wave is fixed and a frequency characteristic of electromagnetic noise in the case where only the carrier frequency is variable, in comparison with each other.

FIG. 5 is a diagram illustrating a frequency characteristic of electromagnetic noise in a case where the switching control device 1 according to the first embodiment is used and a frequency characteristic of electromagnetic noise in the case where the switching square wave is fixed, in comparison with each other. FIG. 5 is a diagram obtained from FIGS. 2 and 3. FIG. 6 is a diagram illustrating a frequency characteristic of electromagnetic noise in the case where the switching square wave is fixed and a frequency characteristic of electromagnetic noise in the case where only the carrier frequency is variable, in comparison with each other. FIG. 6 is a diagram obtained from FIGS. 3 and 4. In each of FIGS. 5 and 6, the horizontal axis represents frequency, and the vertical axis represents noise level. The switching control device 1 outputs, to the switching element 5, a control signal having a square wave in which on times each associated with one of reciprocals of two different frequencies are repeatedly generated. In the specific example in the first embodiment, the two different frequencies are a carrier frequency of 15 kHz and a carrier frequency of 30 KHz.

It can be seen that, as illustrated in FIG. 5, noise is reduced in a certain range in a band from 400 KHz to 600 KHz including 460 kHz in the case where the two types of carrier frequencies f1 and f2 are set, as compared with the case where the carrier frequency is fixed. On the other hand, as illustrated in FIG. 6, in the case where the carrier frequency is variable, a harmonic component in which noise is locally reduced is also observed, but noise of a harmonic component around 460 kHz is not reduced, and a sufficient noise reduction effect is not obtained with a certain bandwidth. Since an upper limit value in electromagnetic noise standards is generally defined in a certain bandwidth, a method in which the switching control device 1 according to the first embodiment sets the two types of carrier frequencies f1 and f2, the frequency change period T, and the phase difference $\Delta\varphi$ is effective in evaluation of the upper limit value in the standards.

$\Delta\varphi=0.913\pi$ in the first embodiment is merely an example, and there are a plurality of solutions of phase differences capable of reducing noise at 460 kHz as expressed by formula (4) to be described later. Although the reduction of noise at 460 KHz has been described so far as an example, a frequency at which noise is reduced is not limited to 460 kHz. The switching control device 1 may reduce noise in a band in which electromagnetic noise has a maximum value in a circuit resonance, for example.

In the first embodiment, a switching square wave is determined by using a variable frequency and a phase shift under a condition that a duty ratio is fixed. Even if it is interpreted that a variable frequency and a variable duty ratio are used under a condition that a phase is fixed, it is possible to define a switching square wave similar to the switching square wave determined by using the variable frequency and the phase shift under the condition that the duty ratio is fixed.

The frequency change period T=1/f1+1/f2 is determined from the sum of the reciprocals of the respective frequencies, but as described later, the frequency change period T may be set to be shorter than a time width determined by a reciprocal of a resolution bandwidth. The two types of carrier frequencies may be determined from the frequency change period T. The carrier frequencies may be determined in consideration of some or all of hardware constraints such as performance of the switching element 5, loss of a passive component, and a thermal upper limit, and constraints of a microcomputer, or may be comprehensively determined in consideration of influence of a harmonic on a band of another order.

Figure 7:
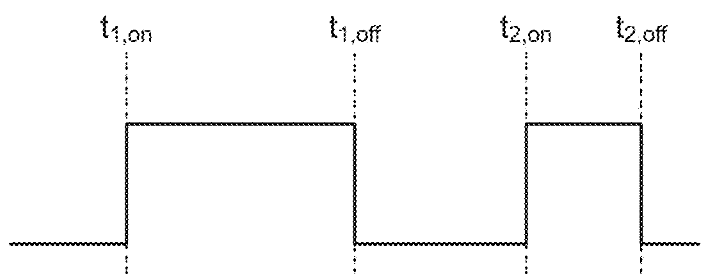
FIG. 7 is a diagram illustrating a time waveform of a switching square wave.

Hereinafter, a specific method for determining the phase difference $\Delta\varphi$ will be described. FIG. 7 is a diagram illustrating a time waveform of a switching square wave. FIG. 7 illustrates a concept of a switching square wave. A harmonic noise component A, of the switching square wave can be calculated by Fourier series expansion of a time waveform f(t) of the switching square wave as expressed by the following formula (1). f(t) is a function in which f(t)=1 holds only when time t is between $t_{1,on}$ and $t_{1,off}$, and when time t is between $t_{2,on}$ and $t_{2,off}$, and f(t)=0 holds otherwise. Time $t_{1,on}$ is a time when the switching square wave is turned on by the carrier frequency f1, time $t_{1,off}$ is a time when the switching square wave is turned off by the carrier frequency f1, time $t_{2,on}$ is a time when the switching square wave is turned on by the carrier frequency f2, and time $t_{2,off}$ is a time when the switching square wave is turned off by the carrier frequency f2.

Formula 1

$$A_n = \frac{1}{T}\int_{-T/2}^{T/2} f(t)e^{-i\frac{2\pi nt}{T}}dt \tag{1}$$

$$= \frac{1}{2\pi n}\left(e^{-i\frac{2\pi nt_{1,off}}{T}} - e^{-i\frac{2\pi nt_{1,on}}{T}} + e^{-i\frac{2\pi nt_{2,off}}{T}} - e^{-i\frac{2\pi nt_{2,on}}{T}}\right)$$

$$f(t) = \begin{cases} 1 & (t_{1,on} \le t \leqq t_{1,off},\ t_{2,on} \le t \leqq t_{2,off}) \\ 0 & (\text{otherwise}) \end{cases}$$

Figure 8:
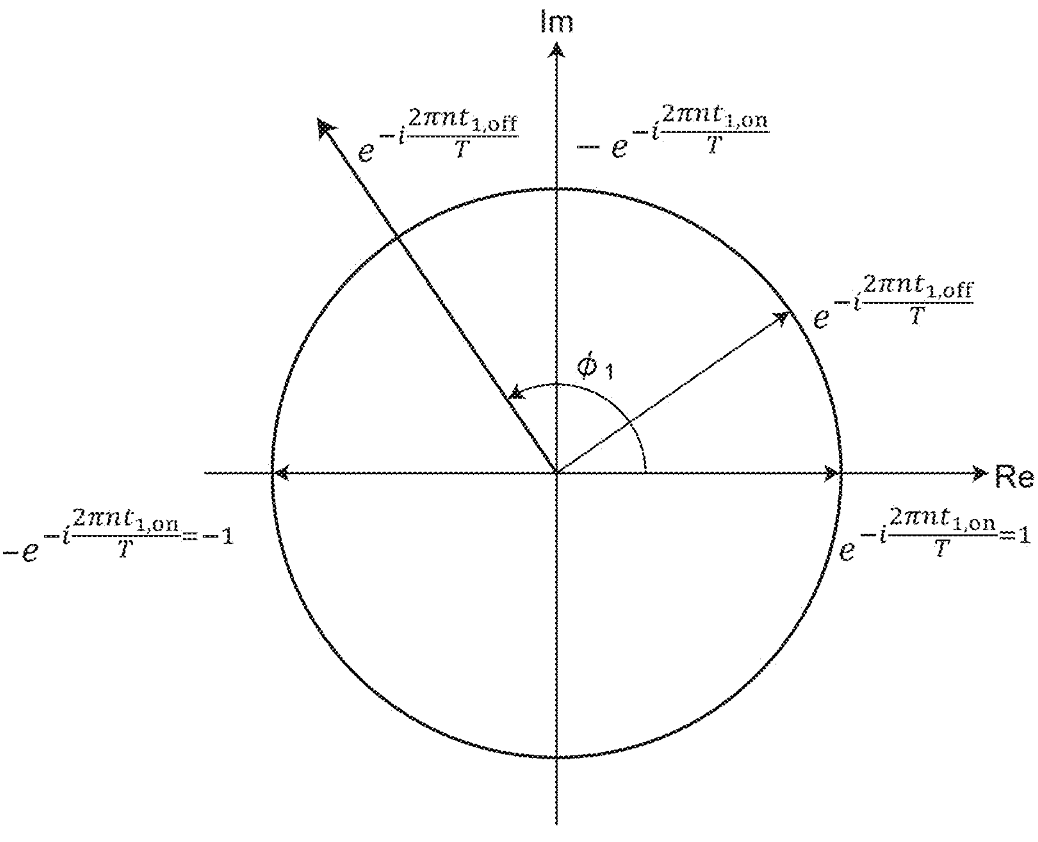
FIG. 8 is a diagram illustrating a phase of a composite vector of two terms determined by switching times of a certain carrier frequency on a complex plane.

From formula (1), it can be seen that the harmonic noise component $A_n$ can be expressed by using two terms $\exp\{-i\times(2\pi nt_{1,off})/T\}$ and $\exp\{-i\times(2\pi nt_{1,on})/T\}$ determined by switching times $t_{1,on}$ and $t_{1,off}$ of the carrier frequency f1, and two terms $\exp\{-i\times(2\pi nt_{2,off})/T\}$ and $\exp\{-i\times(2\pi nt_{2,on})/T\}$ determined by switching times $t_{2,on}$ and $t_{2,off}$ of the carrier frequency f2. Noise can be reduced by selecting the phase difference so that the absolute value of the sum of the two terms is decreased. Since coefficients of respective terms are equal, it is sufficient to consider a phase relationship between the respective terms on a complex plane. FIG. 8 is a diagram illustrating a phase $\varphi_1$ of a composite vector of two terms determined by switching times $t_{1,on}$ and $t_{1,off}$ of the carrier frequency f1 on the complex plane. In FIG. 8, time $t_{1,on}$ is a reference, and time $t_{1,on}=0$ holds. A relationship between the phase $\varphi_1$ and each variable is expressed by the following formula (2). For example, the switching control device 1 sets switching time $t_{1,on}$ of the carrier frequency f1 as a reference time, that is, time $t_{1,on}=0$, for formulas (1) and (2).

Formula 2

$$\phi_1 = -\frac{\pi nt_{1,on}}{T} + \frac{\pi}{2} - \frac{\pi nt_{1,off}}{T} \tag{2}$$

FIG. 9 is a diagram illustrating a phase $\varphi_2$ of a composite vector of two terms determined by switching times $t_{2,on}$ and $t_{2,off}$ of the carrier frequency f2 on the complex plane. A relationship between the phase $\varphi_2$ and each variable is expressed by the following formula (3).

Formula 3

$$\phi_2 = -\frac{\pi nt_{2,on}}{T} + \frac{\pi}{2} - \frac{\pi nt_{2,off}}{T} \tag{3}$$

A condition that the harmonic noise component $A_n$ decreases is that the composite vector of two terms determined by switching times $t_{1,on}$ and $t_{1,off}$ of the carrier frequency f1 and the composite vector of two terms determined by switching times $t_{2,on}$ and $t_{2,off}$ of the carrier frequency f2 cancel each other on the complex plane. That is, as expressed by the following formula (4), it is sufficient that a phase difference between the phase $\varphi_1$ and the phase 2 is shifted by an odd multiple of $\pi$. In a broader sense, it is sufficient that the phase difference between the phase $\varphi_1$ and the phase $\varphi_2$ is between $\pi/2$ and $3\pi/2$ as expressed by the following formula (5). k is an integer of 1 or more. That is, in order to decrease the harmonic noise component $A_n$, the switching control device 1 approximates the phase difference between the phase $\varphi_1$ of the composite vector of the two terms determined by switching times $t_{1,on}$ and $t_{1,off}$ of the carrier frequency f1 on the complex plane and the phase $\varphi_2$ of the composite vector of the two terms determined by switching times $t_{2,on}$ and $t_{2,off}$ of the carrier frequency f2 on the complex plane to a value as close as possible to an odd multiple of $\pi$. In the first embodiment, n=46 is set in order to reduce noise at 460 kHz in the frequency change period T=100 μs. Although the phase difference $\Delta\varphi=0.913\pi$ is set in order to reduce noise in a band having a certain range around 460 kHz, the phase difference $\Delta\varphi=\pi$ may be set in a case where it is desired to reduce noise at 460 kHz in a narrower band.

Formula 4

$$|\phi_2 - \phi_1| = (2k-1)\pi \tag{4}$$

Formula 5

$$\frac{\pi}{2} + 2k\pi < |\phi_2 - \phi_1| < \frac{3\pi}{2} + 2k\pi \tag{5}$$

As expressed by formulas (2) and (3), the phase $\varphi_1$ and the phase $\varphi_2$ include a term of $\pi/2$, but in a case where a relative phase difference of the phase difference $\Delta\varphi=|\varphi_1-\varphi_2|$ is considered, $(t_{1,on}+t_{1,off})/2$ and $(t_{2,on}+t_{2,off})/2$ are important. That is, it is sufficient to consider a time difference between an intermediate time between an on time and an off time of a certain switching square wave and an intermediate time between an on time and an off time of the next switching square wave.

In the first embodiment, a phase shift amount is the phase difference $\Delta\varphi$, but the phase shift amount may be defined by a time difference $\Delta t$. For example, suppose that in the first embodiment, on time $t_{1,on}$ of the carrier frequency f1 is set as the reference time, that is, $t_{1,on}=0$, then an on state is switched to an off state after time D/f1 corresponding to the duty ratio elapses, then the on time of the carrier frequency f2 is set to 1/f1+$\Delta t$, and the on state is switched to the off state after time D/f2 corresponding to the duty ratio elapses from the on time of f2, respective times can be expressed as $t_{1,on}=0$, $t_{1,off}$=D/f1, $t_{2,on}$=1/f1+$\Delta t$, and $t_{2,off}$=1/f1+$\Delta t$+D/f1. Therefore, from formulas (2), (3), and (4), $\Delta t$ can be expressed as the following formula (6).

Formula 6

$$\Delta t = \frac{2k-1}{2n}T - \frac{2-D}{f1} - \frac{D}{f2} \tag{6}$$

At that time, when n=46, k=61, and D=0.5 in the first embodiment, a time difference corresponding to $\Delta\varphi=0.913\pi$ is $\Delta t$=14.8 μs. Here, time $t_{2,on}$ is shifted, but any of times $t_{1,on}$, $t_{1,off}$, $t_{2,on}$, and $t_{2,off}$ may be shifted as long as a relative phase difference can be set. Regarding switching timing, on time $t_{1,on}$ of the carrier frequency f1 may not be set as the reference time, and it is sufficient that the relative phase difference $\Delta\varphi$ can be set, in order to obtain the noise reduction effect.

Next, a relationship between various detection methods and a noise reduction effect will be described. The detection methods include peak detection, quasi-peak detection, and average detection. A spectrum calculation method regarding, in particular, the peak detection with severe conditions for obtaining noise reduction will be explicitly depicted, and it will be described that the noise reduction effect can be widely obtained depending on various measurement conditions by the present disclosure. FIG. 10 is a diagram for explaining a spectrum calculation method in short-time Fourier transform. In short-time Fourier transform used in an electromagnetic interference (EMI) receiver or the like, with respect to a time waveform acquired in a certain measurement time, a section of the time waveform is cut out by a window function and subjected to fast Fourier transform (FFT) to thereby acquire a spectrum in the section. Sections to be cut out by the window function as described above are shifted little by little to acquire a plurality of spectra. A peak value of each of the plurality of spectra is extracted, which is a spectrum obtained by peak detection, and an average value thereof is calculated, which is a spectrum obtained by average detection. In a case where the spectral shapes of the plurality of spectra acquired by shifting the sections to be cut out by the window function little by little are greatly different from each other, the peak value of each of the plurality of spectra is referred to, so that it is difficult to obtain the noise reduction effect in the peak detection. Therefore, a method is also proposed in which a frequency change period is made shorter than a window function width Tw to thereby decrease a difference in spectral shapes obtained in respective sections, and thus the noise reduction effect is obtained in the peak detection, as described in Patent Literature 2. However, as described in the first embodiment, when there are fewer switching pulses entering one window function, the noise reduction effect may not be sufficiently obtained. The switching control device 1 according to the first embodiment reduces noise in a harmonic component of a specific order by combining a variable frequency and a phase shift, and can effectively obtain the noise reduction effect even in a situation where noise reduction is difficult as described above. By extension, the frequency setting unit 2 sets the two types of carrier frequencies f1 and f2 and the frequency change period T which is a period in which the carrier frequencies change depending on the harmonic component of the specific order, the phase shift setting unit 3 sets the phase difference $\Delta\varphi$ between the switching square wave determined by the carrier frequency f1 set by the frequency setting unit 2 and the switching square wave determined by the carrier frequency f2 set by the frequency setting unit 2, and the control signal generation unit 4 outputs the control signal for controlling the switching operation performed by the switching element 5 on the basis of the settings performed by the frequency setting unit 2 and the phase shift setting unit 3, so that the switching control device 1 can effectively reduce noise in the harmonic component of the specific order even in the situation where noise reduction is difficult.

The window function width Tw is determined by a reciprocal of a resolution bandwidth (RBW), and takes various values depending on a standard or a band of interest. Representative values of the resolution bandwidth include 200 Hz, 1 kHz, 9 kHz, 10 KHz, 120 kHz, and 1 MHz, and in particular, in a band from 526 kHz to 1620 kHz which is an amplitude modulation (AM) radio band in which there is a significant problem of electromagnetic noise, 9 kHz or 10 kHz is defined as the resolution bandwidth.

In the first embodiment, since T=100 μs, the window function width Tw determined by the reciprocal of RBW=9 kHz is 111 μs, or the window function width Tw determined by the reciprocal of RBW=10 kHz is 100 μs or less, so that a sufficient noise reduction effect can be obtained also in the peak detection with RBW=9 kHz and RBW=10 KHz.

General inverters often use any of carrier frequencies of several kHz to about 20 kHz, and direct-current to direct-current (DC-DC) converters use any of carrier frequencies of wide range of values of several kHz to several MHz.

As described above, in the switching control device 1 according to the first embodiment, the frequency setting unit 2 sets the two types of carrier frequencies f1 and f2, the phase shift setting unit 3 sets the phase difference Δφ between the switching square wave determined by the carrier frequency f1 set by the frequency setting unit 2 and the switching square wave determined by the carrier frequency f2 set by the frequency setting unit 2, and the control signal generation unit 4 outputs the control signal for controlling the switching operation performed by the switching element 5 on the basis of the settings performed by the frequency setting unit 2 and the phase shift setting unit 3. Therefore, in the method of the first embodiment, the noise reduction effect can also be obtained in the average detection.

As a representative detection method other than the peak detection and the average detection, there is quasi-peak detection in which a time constant circuit is added to the peak detection. In the method of the first embodiment, since a repetition period of switching is sufficiently fast with respect to the time constant, a spectrum substantially similar to that in the peak detection is obtained, and an effect similar to that obtained in the peak detection is obtained also in the quasi-peak detection.

Even with an instrument using a measurement method other than short-time Fourier transform, for example, a sweep-tuned spectrum analyzer, it is possible to expect to obtain an effect similar to the above-described effect.

Determination of the phase shift amount requires complicated calculation, and it is difficult to obtain the effect obtained by the switching control device 1 according to the first embodiment only by simply combining a conventional variable frequency and a conventional phase shift.

As described above, the switching control device 1 according to the first embodiment includes the frequency setting unit 2 that sets the two types of carrier frequencies f1 and f2, the phase shift setting unit 3 that sets the phase difference Δφ between the switching square wave determined by the carrier frequency f1 set by the frequency setting unit 2 and the switching square wave determined by the carrier frequency f2 set by the frequency setting unit 2, and the control signal generation unit 4 that generates the control signal for controlling the switching operation performed by the switching element 5 on the basis of the settings performed by the frequency setting unit 2 and the phase shift setting unit 3. In the switching control device 1, the frequency setting unit 2 sets the carrier frequency f1 and the carrier frequency f2 and the phase shift setting unit 3 sets the phase difference Δφ so as to reduce switching noise of the harmonic component when the switching element 5 performs the switching operation. Therefore, the switching control device 1 can obtain a noise reduction effect under more various measurement conditions. By extension, the switching control device 1 can more effectively reduce noise in the harmonic component of the specific order by changing the carrier frequencies and the phase.

Second Embodiment

Figure 11:
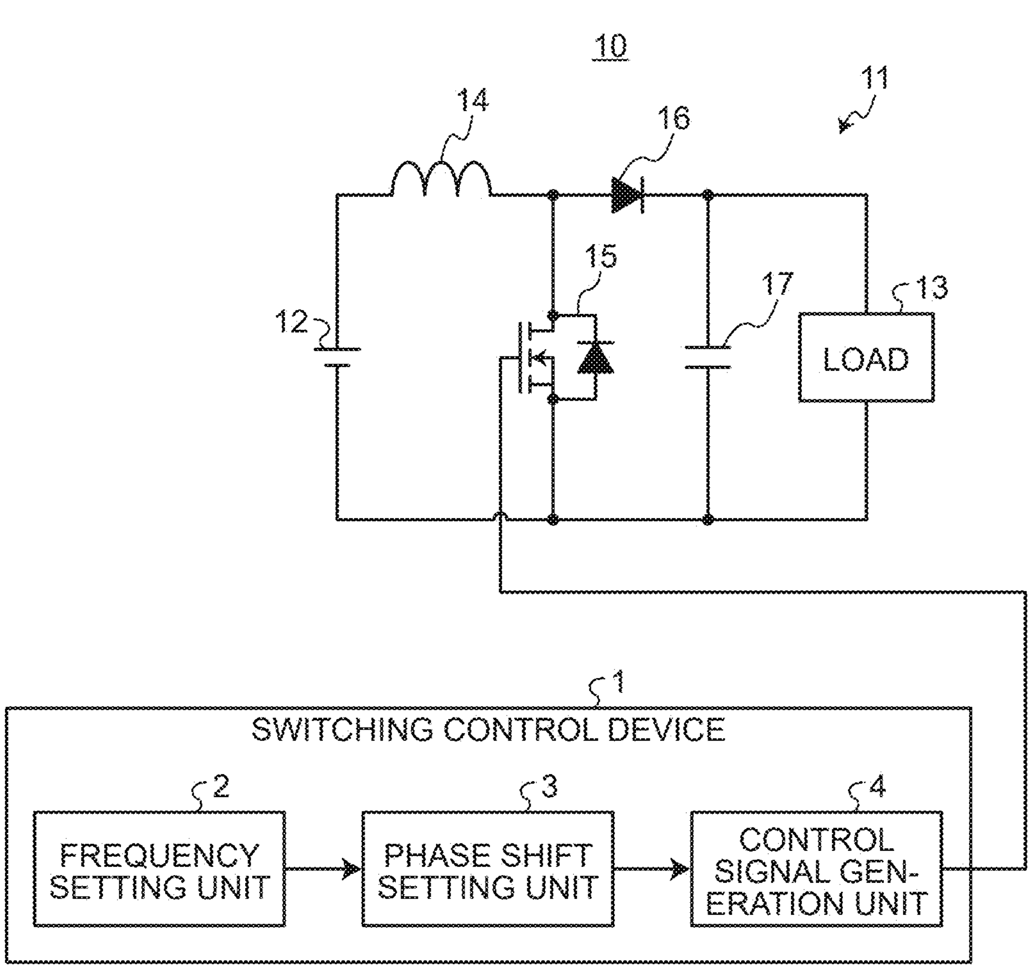
FIG. 11 is a diagram illustrating a configuration of a power conversion device according to a second embodiment.

FIG. 11 is a diagram illustrating a configuration of a power conversion device 10 according to a second embodiment. The power conversion device 10 includes the switching control device 1 according to the first embodiment and a boost chopper circuit 11 connected to a direct-current power supply 12 and a load 13. The boost chopper circuit 11 is an example of a power conversion circuit, and includes a reactor 14, a switching element 15, a diode 16, and a smoothing capacitor 17.

The switching element 15 performs a switching operation at timing in accordance with a control signal output from the control signal generation unit 4 included in the switching control device 1. The boost chopper circuit 11 boosts a voltage of input power from the direct-current power supply 12 and supplies output power of a desired voltage to the load 13. As the switching element 15, a semiconductor switching element such as a metal-oxide-semiconductor field-effect transistor (MOSFET) or an insulated gate bipolar transistor (IGBT), in which the diode 16 is connected in anti-parallel, is used.

Since the power conversion device 10 changes a duty ratio depending on the state of the load 13 in order to obtain a desired voltage, a phase shift amount also needs to be changed in line with the duty ratio. The phase shift amount may be sequentially calculated in line with a control state, or may be determined on the basis of a table calculated in advance.

The power conversion circuit may be a DC-DC converter other than the boost chopper circuit 11, for example, a buck chopper circuit.

Third Embodiment

Figure 12:
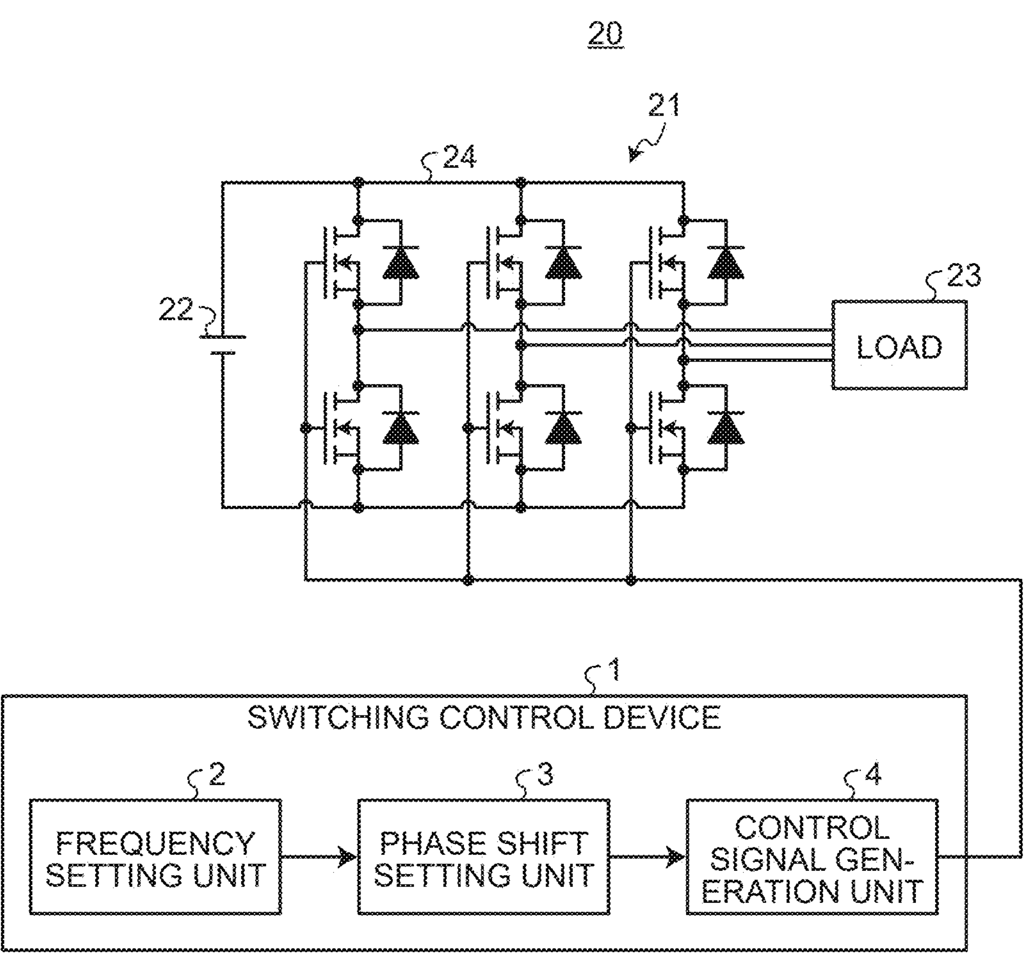
FIG. 12 is a diagram illustrating a configuration of a power conversion device according to a third embodiment.

FIG. 12 is a diagram illustrating a configuration of a power conversion device 20 according to a third embodiment. The power conversion device 20 includes the switching control device 1 according to the first embodiment, and an inverter circuit 21 connected to a direct-current power supply 22 and a load 23. The inverter circuit 21 is an example of a power conversion circuit, and includes switching elements 24.

Each switching element 24 performs a switching operation at timing in accordance with a control signal output from the control signal generation unit 4 included in the switching control device 1. The inverter circuit 21 boosts a voltage of input power from the direct-current power supply 22 and supplies desired alternating-current output power to the load 23. As the switching element 24, a semiconductor switching element such as a MOSFET or an IGBT, in which a diode is connected in anti-parallel, is used.

The inverter circuit 21 also needs to change the phase shift amount in line with pulse width modulation control for obtaining a desired output voltage of an inverter. The phase shift amount may be sequentially calculated in line with a control state, or may be determined on the basis of a table calculated in advance.

The power conversion circuit may be a circuit in which a converter and an inverter are combined in parallel or in series.

Note that the switching control device 1 according to the first embodiment may be the following switching control device 1. That is, the frequency setting unit 2 may set at least two types of carrier frequencies, and the phase shift setting unit 3 may set a phase difference between a switching square wave determined by a first carrier frequency of the two carrier frequencies set by the frequency setting unit 2, and a switching square wave determined by a second carrier frequency thereof. The phase shift setting unit 3 may set a phase difference between a switching square wave determined by the first carrier frequency of the two carrier frequencies set by the frequency setting unit 2, the two carrier frequencies having values adjacent to each other, and a switching square wave determined by the second carrier frequency thereof. The frequency setting unit 2 may set m types of carrier frequencies and a frequency change period. m is an integer of 2 or more. The control signal generation unit 4 may generate a switching waveform in a control signal by transitioning m types of carrier frequencies in the frequency change period T. In a case where a phase is denoted by $\varphi_i$, the phase being calculated on the basis of time $t_{i,on}$ when a switching square wave is turned on by an i-th frequency fi among the m types of carrier frequencies and time $t_{i,off}$ when the switching square wave is turned off by the i-th frequency fi in the frequency change period T, the phase shift setting unit 3 may set the phase difference such that an absolute value of a phase difference between a phase $\varphi_i$ and a phase $\varphi_{i+1}$ becomes $\pi$/m or more and $3\pi$/m or less. i is an integer of 1 or more. The phase $\varphi_i$ may be defined by a formula of $\varphi_i=\pi n t_{i,on}/T+\pi n t_{i,off}/T$. n is an integer of 1 or more and means the order of a harmonic component for which noise reduction is desired. The phase difference between the phase $\varphi_i$ and the phase $\varphi_{i+1}$ may be $2\pi$/m.

Fourth Embodiment

In the first embodiment, the frequency setting unit 2 sets the two types of carrier frequencies f1 and f2 and the frequency change period T which is a period in which the carrier frequencies change. As described above, the frequency setting unit 2 may set the m types of carrier frequencies and the frequency change period T which is a period in which the carrier frequencies change. m is an integer of 2 or more. In a fourth embodiment, a switching control device in a case where m is 3 will be described. The switching control device according to the fourth embodiment includes the frequency setting unit 2, the phase shift setting unit 3, and the control signal generation unit 4, similarly to the switching control device 1 according to the first embodiment. In the fourth embodiment, differences from the first embodiment will be mainly described. In the second and third embodiments, the switching control device 1 according to the first embodiment may be replaced with the switching control device according to the fourth embodiment.

Values of parameters in the fourth embodiment are as follows.

$$n = 33$$

$$T = 100\ \mu\text{s}$$

$$f1 = 20\ \text{kHz}$$

$$f2 = 30\ \text{kHz}$$

$$f3 = 60\ \text{KHz}$$

$$\varphi_1 = 0.75\pi$$

-continued $$\varphi_2 = 1.69\pi$$

$$\varphi_3 = 0.05\pi$$

$$\Delta\varphi_{12} = \varphi_2 - \varphi_1 = 0.94\pi$$

$$\Delta\varphi_{23} = \varphi_3 - \varphi_2 = -1.64\pi = 0.36\pi$$

$$\Delta\varphi_{31} = \varphi_1 - \varphi_3 = 0.7\pi$$

In the above parameters, n, T, f1, f2, $\varphi_1$, and $\varphi_2$ are those described in the first embodiment. f3 means a third carrier frequency different from f1 and f2. $\varphi_3$ means a phase of a composite vector of two terms determined by switching times $t_{3,on}$ and $t_{3,off}$ of the carrier frequency f3 on the complex plane. Time $t_{3,on}$ is a time when a switching square wave is turned on by the carrier frequency f3, and time $t_{3,off}$ is a time when the switching square wave is turned off by the carrier frequency f3. $\Delta\varphi_{12}$ is a phase difference between $\varphi_2$ and $\varphi_1$, $\Delta\varphi_{23}$ is a phase difference between $\varphi_3$ and $\varphi_2$, and $\Delta\varphi_{31}$ is a phase difference between $\varphi_1$ and $\varphi_3$. The phase difference is defined in a range of 0 to $2\pi$.

In the fourth embodiment, the harmonic noise component $A_n$ of the switching square wave is expressed by the following formula (7). A relationship between the phase $\varphi_3$ and each variable is expressed by the following formula (8). $\Delta\varphi_{ij}$ is expressed by the following formula (9). In formula (9), each of i and j is any one of 1, 2, and 3, and i is different from j. In a case where $\Delta\varphi_{ij}$ does not exist in the range of 0 to $2\pi$, $\Delta\varphi_{ij}$ is replaced with $\Delta\varphi_{ij}+2\pi$ or $\Delta\varphi_{ij}-2\pi$ such that $\Delta\varphi_{ij}$ exists in the range of 0 to $2\pi$.

Formula 7

$$A_n = \frac{1}{T}\int_{-T/2}^{T/2} f(t)e^{-i\frac{2\pi nt}{T}}dt = \frac{1}{2\pi n}\begin{pmatrix} e^{-i\frac{2\pi nt_{1,off}}{T}} - e^{-i\frac{2\pi nt_{1,on}}{T}} + e^{-i\frac{2\pi nt_{2,off}}{T}} - \\ e^{-i\frac{2\pi nt_{2,on}}{T}} + e^{-i\frac{2\pi nt_{3,off}}{T}} - e^{-i\frac{2\pi nt_{3,on}}{T}} \end{pmatrix} \tag{7}$$

$$f(t) = \begin{cases} 1 & (t_{1,on} \leqq t \leqq t_{1,off},\ t_{2,on} \leqq t \leqq t_{2,off},\ t_{3,on} \leqq t \leqq t_{3,off}) \\ 0 & (\text{otherwise}) \end{cases}$$

Formula 8

$$\phi_3 = -\frac{\pi n t_{3,on}}{T} + \frac{\pi}{2} - \frac{\pi n t_{3,off}}{T} \tag{8}$$

Formula 9

$$\Delta\phi_{ij} = \phi_j - \phi_i \tag{9}$$

The switching control device according to the fourth embodiment can reduce noise of an n-th order harmonic component by setting the phase difference $\Delta\varphi_{12}$, the phase difference $\Delta\varphi_{23}$, and the phase difference $\Delta\varphi_{31}$ such that each of $\Delta\varphi_{12}$, $\Delta\varphi_{23}$, and $\Delta\varphi_{31}$ satisfies the following formula (10).

Formula 10

$$\frac{\pi}{3} < \Delta\phi_{ij} < \pi \tag{10}$$

Figure 13:
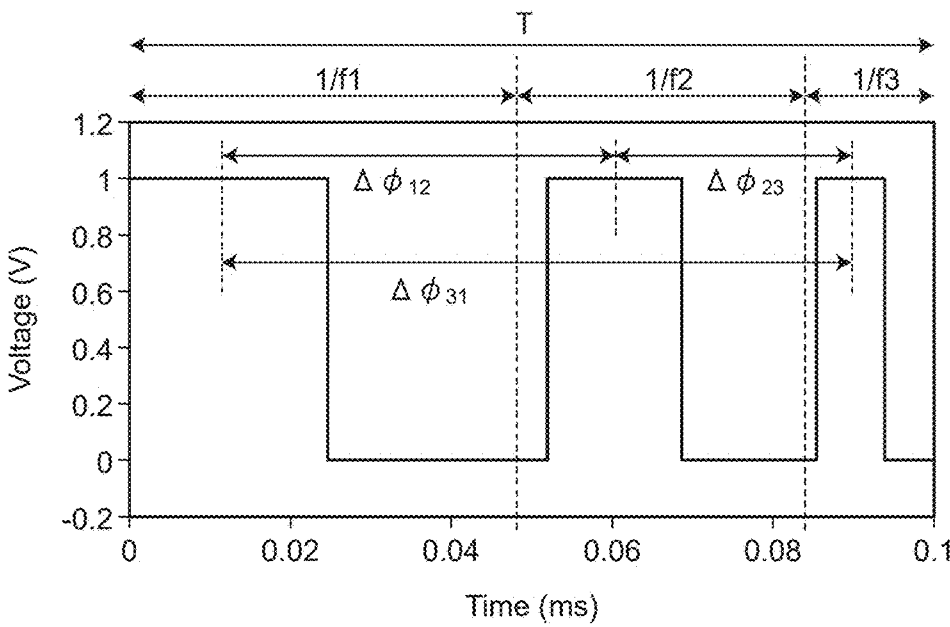
FIG. 13 is a diagram illustrating an example of a time waveform of a switching square wave in a control signal output from the control signal generation unit included in a switching control device according to a fourth embodiment.
Figure 14:
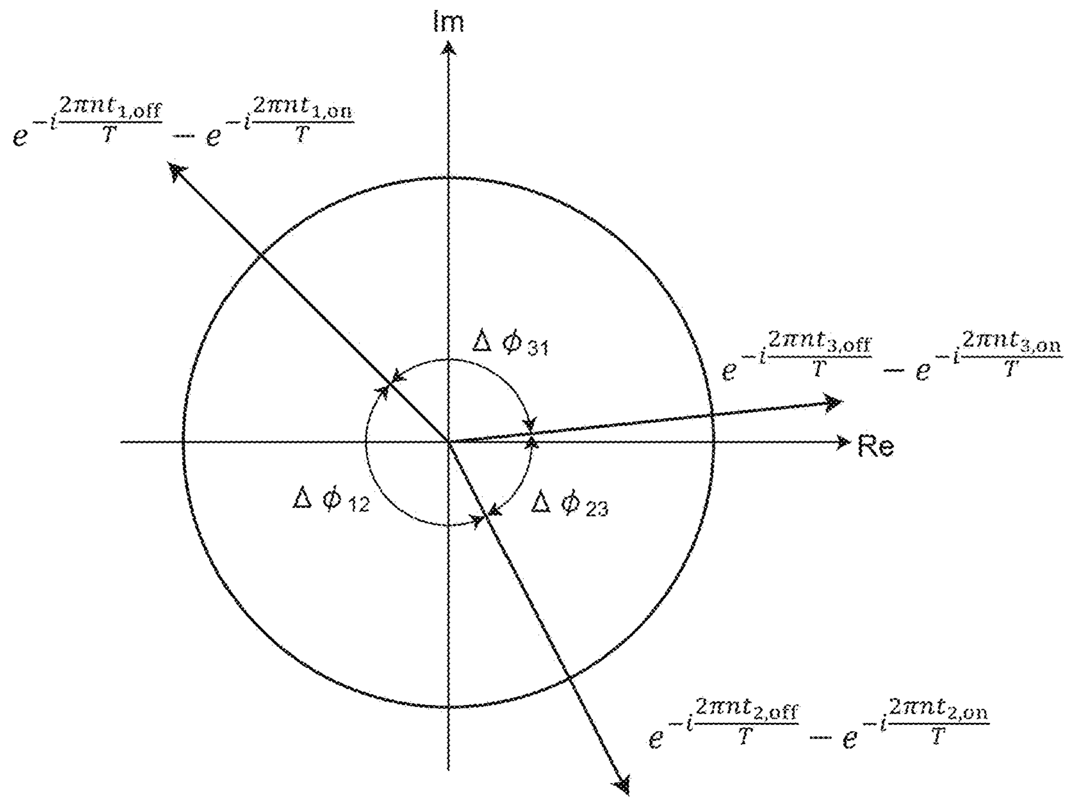
FIG. 14 is a diagram illustrating three phase differences on the complex plane.
Figure 15:
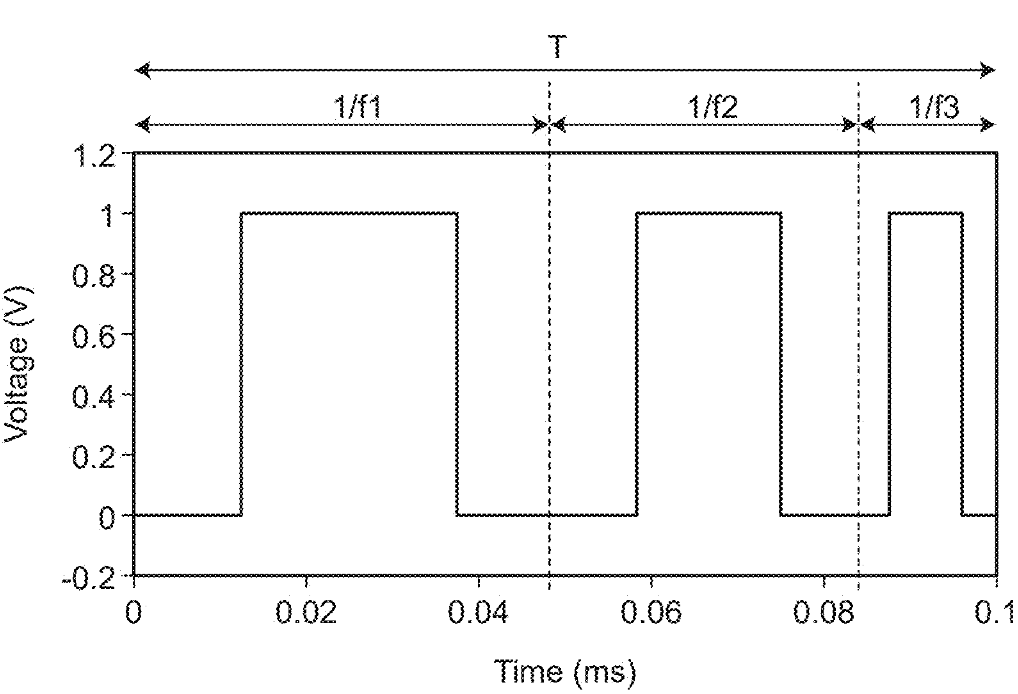
FIG. 15 is a diagram illustrating an example of a time waveform of a switching square wave in a case where a frequency is variable.
Figure 16:
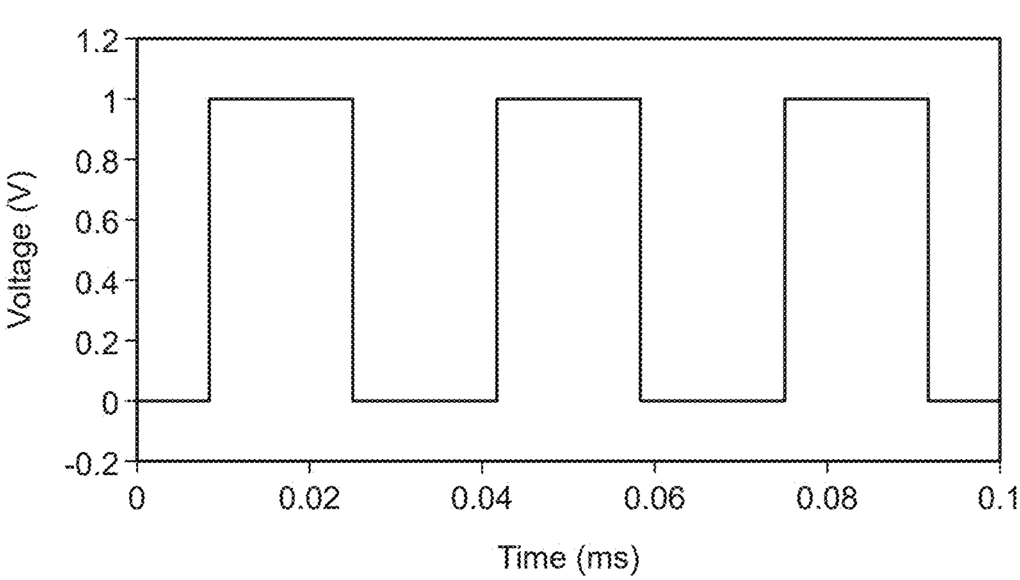
FIG. 16 is a diagram illustrating an example of a time waveform of a switching square wave in a case where the frequency is fixed.

FIG. 13 is a diagram illustrating an example of a time waveform of a switching square wave in a control signal output from the control signal generation unit 4 included in the switching control device according to the fourth embodiment. FIG. 13 is also a diagram for explaining the three phase differences of $\Delta\varphi_{12}$, $\Delta\varphi_{23}$, and $\Delta\varphi_{31}$. FIG. 14 is a diagram illustrating the three phase differences of $\Delta\varphi_{12}$, $\Delta\varphi_{23}$, and $\Delta\varphi_{31}$ on the complex plane. FIG. 15 is a diagram illustrating an example of a time waveform of a switching square wave in a case where a frequency is variable. FIG. 16 is a diagram illustrating an example of a time waveform of a switching square wave in a case where the frequency is fixed. In each of FIGS. 13, 15, and 16, the horizontal axis represents time and the vertical axis represents voltage. In FIG. 16, 30 KHz is used as a fixed switching frequency. The fixed switching frequency of 30 kHz is selected in order to make the number of times of switching equivalent to the number of times of switching by the three types of carrier frequencies in FIG. 13, thereby making a switching loss condition comparable.

Figure 17:
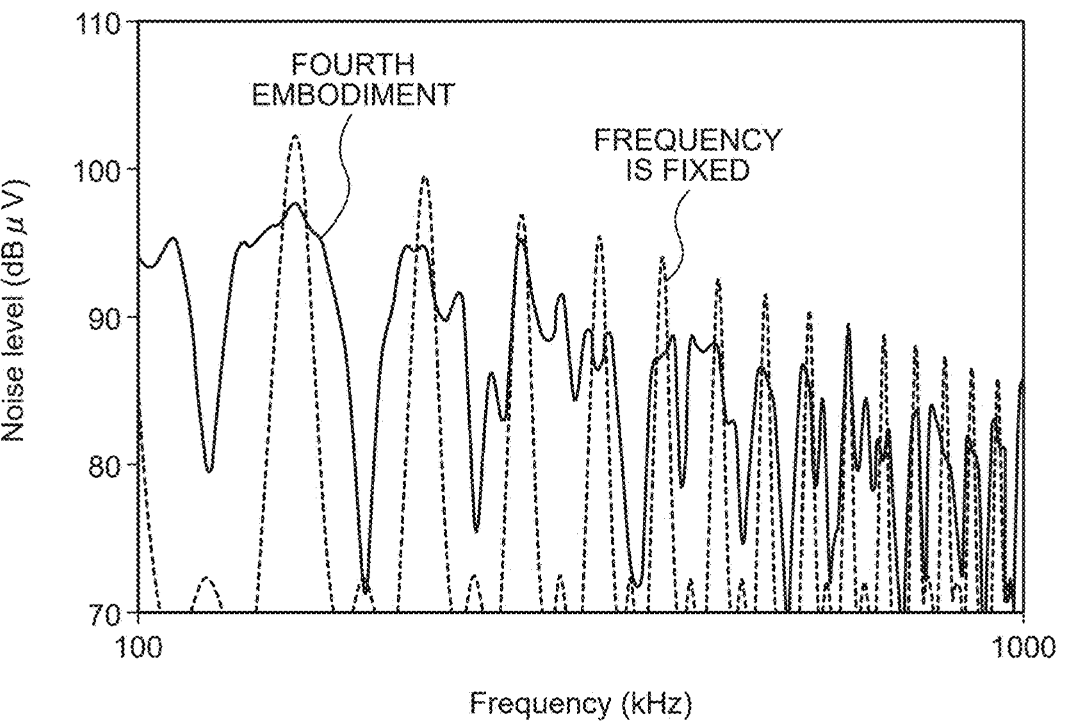
FIG. 17 is a diagram illustrating a frequency characteristic of electromagnetic noise in a case where the switching control device according to the fourth embodiment is used and a frequency characteristic of electromagnetic noise in a case where the switching square wave is fixed, in comparison with each other.
Figure 18:
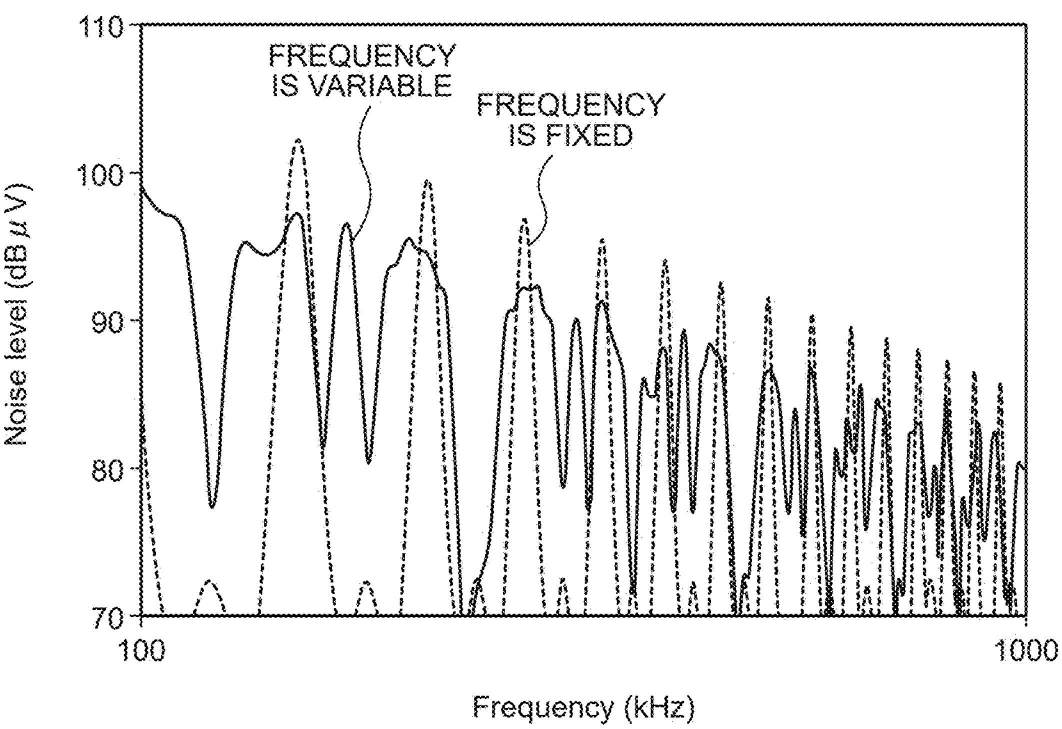
FIG. 18 is a diagram illustrating a frequency characteristic of electromagnetic noise in the case where the switching square wave is fixed and a frequency characteristic of electromagnetic noise in a case where only a carrier frequency is variable, in comparison with each other.

FIG. 17 is a diagram illustrating a frequency characteristic of electromagnetic noise in a case where the switching control device according to the fourth embodiment is used and a frequency characteristic of electromagnetic noise in a case where the switching square wave is fixed, in comparison with each other. FIG. 18 is a diagram illustrating a frequency characteristic of electromagnetic noise in the case where the switching square wave is fixed and a frequency characteristic of electromagnetic noise in a case where only a carrier frequency is variable, in comparison with each other.

It can be seen that, as illustrated in FIG. 17, noise is reduced in a certain range in a band from 310 kHz to 400 kHz including 330 kHz in the fourth embodiment, as compared with the case where the frequency is fixed. On the other hand, as illustrated in FIG. 18, in the case where a frequency is variable, a harmonic component of 330 kHz is larger than that in the fourth embodiment. The method of the fourth embodiment is also effective in a case where noise of a harmonic component of a specific order is reduced.

Figure 19:
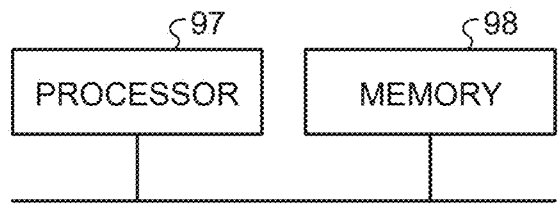
FIG. 19 is a diagram illustrating a processor in a case where at least a part of a frequency setting unit, a phase shift setting unit, and the control signal generation unit included in the switching control device according to the first embodiment is realized by the processor.

FIG. 19 is a diagram illustrating a processor 97 in a case where at least a part of the frequency setting unit 2, the phase shift setting unit 3, and the control signal generation unit 4 included in the switching control device 1 according to the first embodiment is realized by the processor 97. That is, at least a part of functions of the frequency setting unit 2, the phase shift setting unit 3, and the control signal generation unit 4 of the first embodiment may be realized by the processor 97 that executes a program stored in a memory 98. The processor 97 is a central processing unit (CPU), a processing system, an arithmetic system, a microprocessor, or a digital signal processor (DSP). FIG. 19 also illustrates the memory 98.

In a case where at least a part of the functions of the frequency setting unit 2, the phase shift setting unit 3, and the control signal generation unit 4 of the first embodiment is realized by the processor 97, the at least part of the functions is realized by a combination of the processor 97 and software, firmware, or software and firmware. The software or the firmware is described as a program and stored in the memory 98. By reading and executing the program stored in the memory 98, the processor 97 realizes at least a part of the functions of the frequency setting unit 2, the phase shift setting unit 3, and the control signal generation unit 4 of the first embodiment.

In a case where at least a part of the functions of the frequency setting unit 2, the phase shift setting unit 3, and the control signal generation unit 4 of the first embodiment is realized by the processor 97, the switching control device 1 includes the memory 98 for storing programs with which at least a part of steps executed by the frequency setting unit 2, the phase shift setting unit 3, and the control signal generation unit 4 is executed as a result. It can also be said that the programs stored in the memory 98 cause a computer to execute at least a part of a procedure or method executed by the frequency setting unit 2, the phase shift setting unit 3, and the control signal generation unit 4 of the first embodiment.

The memory 98 is, for example, a non-volatile or volatile semiconductor memory such as a random access memory (RAM), a read only memory (ROM), a flash memory, an erasable programmable read only memory (EPROM), or an electrically erasable programmable read-only memory (EEPROM (registered trademark)), a magnetic disk, a flexible disk, an optical disk, a compact disc, a mini disk, a digital versatile disk (DVD), or the like.

Figure 20:
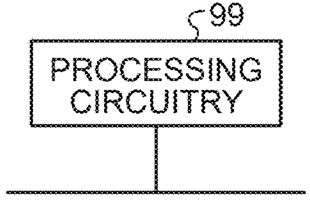
FIG. 20 is a diagram illustrating a processing circuitry in a case where at least a part of the frequency setting unit, the phase shift setting unit, and the control signal generation unit included in the switching control device according to the first embodiment is realized by the processing circuitry.

FIG. 20 is a diagram illustrating a processing circuitry 99 in a case where at least a part of the frequency setting unit 2, the phase shift setting unit 3, and the control signal generation unit 4 included in the switching control device 1 according to the first embodiment is realized by the processing circuitry 99. That is, at least a part of the frequency setting unit 2, the phase shift setting unit 3, and the control signal generation unit 4 of the first embodiment may be realized by the processing circuitry 99.

The processing circuitry 99 is dedicated hardware. The processing circuitry 99 is, for example, a single circuit, a composite circuit, a programmed processor, a parallel programmed processor, an application specific integrated circuit (ASIC), a field-programmable gate array (FPGA), or a combination thereof.

A part of the frequency setting unit 2, the phase shift setting unit 3, and the control signal generation unit 4 of the first embodiment may be realized by dedicated hardware separate from the rest of the frequency setting unit 2, the phase shift setting unit 3, and the control signal generation unit 4.

Regarding a plurality of functions of the frequency setting unit 2, the phase shift setting unit 3, and the control signal generation unit 4 of the first embodiment, a part of the plurality of functions may be realized by software or firmware, and the rest of the plurality of functions may be realized by dedicated hardware. Thus, the plurality of functions of the frequency setting unit 2, the phase shift setting unit 3, and the control signal generation unit 4 of the first embodiment can be realized by hardware, software, firmware, or a combination thereof.

At least a part of the functions of the frequency setting unit 2, the phase shift setting unit 3, and the control signal generation unit 4 included in the switching control device according to the fourth embodiment may also be realized by a processor that executes a program stored in a memory, or may be realized by a processing circuitry.

The configurations described in the embodiments above are merely examples and can be combined with other known technology and part of the configurations can be omitted or modified without departing from the gist thereof.

REFERENCE SIGNS LIST

1 switching control device; 2 frequency setting unit; 3 phase shift setting unit; 4 control signal generation unit; 5, 15, 24 switching element; 10, 20 power conversion device; 11 boost chopper circuit; 12, 22 direct-current power supply; 13, 23 load; 14 reactor; 16 diode; 17 smoothing capacitor; 21 inverter circuit; 97 processor; 98 memory; 99 processing circuitry.

The invention claimed is:

1. A switching control device that controls a switching operation performed by a switching element, the switching control device comprising:

a frequency setting circuitry to set at least a first carrier frequency and a second carrier frequency;

a phase shift setting circuitry to set a phase difference between a first switching square wave determined by the first carrier frequency set by the frequency setting circuitry and a second switching square wave determined by the second carrier frequency set by the frequency setting circuitry; and a controlling circuitry to control the switching operation performed by the switching element on a basis of the phase difference set by the phase shift setting circuitry.

2. The switching control device according to claim 1, wherein the phase shift setting circuitry sets the phase difference so as to reduce switching noise of a harmonic component generated by the switching operation.

3. The switching control device according to claim 2, wherein the frequency setting circuitry sets a first carrier frequency, a second carrier frequency, a frequency change period, and a duty ratio depending on the harmonic component, and the phase shift setting circuitry sets the phase difference depending on the harmonic component.

4. The switching control device according to claim 2, wherein the controlling circuitry is a control signal generating circuitry that generates a control signal for controlling a switching operation performed by the switching element on a basis of settings performed by the frequency setting circuitry and the phase shift setting circuitry, and the frequency setting circuitry sets the at least first carrier frequency and second carrier frequency so as to reduce switching noise of a harmonic component generated by the switching operation.

5. The switching control device according to claim 4, wherein the frequency setting circuitry sets m types of carrier frequencies and a frequency change period, the control signal generating circuitry generates a switching waveform in the control signal by transitioning the m types of carrier frequencies in the frequency change period, and m is an integer of 2 or more.

6. The switching control device according to claim 5, wherein in a case where a phase is denoted by $\varphi_i$, the phase being calculated on a basis of time $t_{i,on}$ when a switching square wave is turned on by an i-th frequency fi among the m types of carrier frequencies and time $t_{i,off}$ when a switching square wave is turned off by the i-th frequency fi in the frequency change period, the phase shift setting circuitry sets the phase difference such that an absolute value of a phase difference between a phase $\varphi_i$ and a phase $\varphi_{i+1}$ becomes $\pi/m$ or more and $3\pi/m$ or less, and i is an integer of 1 or more.

7. The switching control device according to claim 6, wherein the phase $\varphi_i$ is defined by a formula of $\varphi_i=\pi n t_{i,on}/T+\pi n t_{i,off}/T$, n is an integer of 1 or more and means an order of a harmonic component for which noise reduction is desired, and T means the frequency change period.

8. The switching control device according to claim 6, wherein a phase difference between the phase $\varphi_i$ and the phase $\varphi_{i+1}$ is $2\pi/m$.

9. The switching control device according to claim 5, wherein the m is 2.

10. The switching control device according to claim 5, wherein the frequency change period is shorter than a time width determined by a reciprocal of a resolution bandwidth.

11. The switching control device according to claim 10, wherein the resolution bandwidth is any of 200 Hz, 1 kHz, 9 kHz, 10 kHz, 120 kHz, and 1 MHz.

12. A power conversion device comprising:

the switching control device according to claim 1; and a power conversion circuit including a switching element.

* * * * *